United States Patent
Yamada et al.

(10) Patent No.: US 11,998,808 B2
(45) Date of Patent: Jun. 4, 2024

(54) TRAVELING COLLECTOR

(71) Applicant: YAMABIKO CORPORATION, Ohme (JP)

(72) Inventors: Ryota Yamada, Tokyo (JP); Kenji Nakano, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 506 days.

(21) Appl. No.: 17/374,170

(22) Filed: Jul. 13, 2021

(65) Prior Publication Data
US 2022/0008793 A1    Jan. 13, 2022

(30) Foreign Application Priority Data
Jul. 13, 2020 (JP) .................. 2020-120081

(51) Int. Cl.
*A63B 47/02*   (2006.01)
*G05D 1/00*   (2006.01)
*A63B 102/32*   (2015.01)

(52) U.S. Cl.
CPC ......... *A63B 47/021* (2013.01); *G05D 1/0246* (2013.01); *A63B 2047/022* (2013.01); *A63B 2102/32* (2015.10); *A63B 2220/17* (2013.01)

(58) Field of Classification Search
CPC ............ A63B 47/021; A63B 2047/022; A63B 2220/17; G05D 1/0246
See application file for complete search history.

(56) References Cited

U.S. PATENT DOCUMENTS

| | | | | |
|---|---|---|---|---|
| 5,700,997 | A | * 12/1997 | Takemoto | ............... G07D 1/00 273/121 D |
| 2005/0204717 | A1 | 9/2005 | Colens | |

(Continued)

FOREIGN PATENT DOCUMENTS

| | | |
|---|---|---|
| JP | S50-053061 U | 5/1975 |
| JP | H08-276037 A | 10/1996 |

(Continued)

OTHER PUBLICATIONS

Extended European Search Report in Europe Application No. 21185238.9, dated Dec. 6, 2021, 4 pages.

*Primary Examiner* — Saul Rodriguez
*Assistant Examiner* — Willie W Berry, Jr.
(74) *Attorney, Agent, or Firm* — Crowell & Moring LLP

(57) ABSTRACT

To provide a highly reliable, cost-effective traveling collector that can determine the positions of fallen objects, such as balls, on the ground using a simple method, or determine the correct positions of fallen objects, such as balls, on the ground only by improving software and without the need for significant changes to hardware. The traveling collector includes a count sensor as a sensor for detecting the position of each collected ball at a position detected by a satellite positioning system, for example. A controller determines a position, which is obtained by reflecting, based on the positional information on the ball collector at a time point when the ball was counted by touching the count sensor, the movement distance of the ball collector from the time each ball was picked up from the ground by a ball collection wheel till the ball was counted by touching the count sensor in a direction opposite to the traveling direction of the ball collector at that time, as the actual position where each ball was picked up.

13 Claims, 16 Drawing Sheets

(56) References Cited

U.S. PATENT DOCUMENTS

2008/0189004 A1    8/2008  McMurtry et al.
2018/0312095 A1*  11/2018  Eletrabi ................... B60P 1/00

FOREIGN PATENT DOCUMENTS

| | | |
|---|---|---|
| JP | 2963571 B | 8/1999 |
| JP | 2008-220935 A | 9/2008 |
| KR | 101430103 B1 | 8/2014 |
| WO | WO 00/78410 A | 12/2000 |
| WO | WO 2020/097253 A1 | 5/2020 |

* cited by examiner

TRAVELING COLLECTOR

RELATED APPLICATIONS

This application claims priority to Japanese Patent Application No. 2020-120081, filed on Jul. 13, 2020, the entire content of which is incorporated herein by reference.

BACKGROUND OF THE INVENTION

1. Field of the Invention

The present invention relates to a traveling collector for picking up and collecting objects that have fallen and scattered on the ground (i.e., fallen objects), such as golf balls, tennis balls, nuts, and containers, for example, while traveling on the ground. For example, the present invention relates to a traveling collector configured to acquire positional information on the traveling collector by receiving a positioning signal (e.g., a GPS signal) from a satellite of a satellite positioning system.

2. Description of the Related Art

For example, there is known an autonomous (also referred to as "self-propelled") ball collector, also called a ball picker and the like, that collects a number of golf balls scattered on the ground of a golf driving range, for example, while traveling on the ground as described in JP 2963571 B and WO 00/78410 A.

Such a ball collector typically includes, as described in JP 2963571 B and WO 00/78410 A, a ball collection wheel that picks up balls from the ground by rolling on the ground, and a collection tank that receives and stores the balls picked up by the ball collection wheel. Further, nowadays, a ball collector has been put into practical use that includes a contact-type count sensor, specifically, a pressure sensor, disposed between a ball collection wheel and a collection tank, for counting balls to be sent to the collection tank from the ball collection wheel, so as to count the number of balls to be sent to and stored in the collection tank from the ball collection wheel.

As the ball collection wheel of such a ball collector, a ball collection wheel such as the one described in JP S50-53061 U is known that includes a number of discs forming multiple elongated grooves including a number of annular grooves, each annular groove having a number of ball pockets formed therein at equal angular intervals along the circumferential direction for picking up balls on the ground.

SUMMARY OF THE INVENTION

A ball collector with a function of counting the number of collected balls such as the one described above typically includes a controller for which a microcomputer is used. Such a controller counts the number of balls based on a signal from a count sensor. Specifically, the controller increments the number of collected balls by one when a ball has touched the count sensor and a signal (i.e., level) from the count sensor has thus exceeded a predetermined threshold. When the number of balls (i.e., a ball count) counted by the controller has reached a given number (that is, when the collection tank is estimated to have become full), the ball collector stops the ball collecting operation and returns to a station so as to unload the balls in the collection tank into a predetermined ball storage space, and then resumes the ball collecting operation.

By the way, nowadays, to efficiently perform a ball collecting operation, grasping the correct scattering (i.e., distribution) state of balls, the correct dense areas of balls, and the like is considered. For example, as described in JP 2008-220935 A, there is known a technique of collecting ball density distribution information before starting a ball collecting operation, and performing a ball collecting operation starting with an area with a high ball distribution rate (i.e., density) while detecting the position of the ball collector in a work area using a satellite positioning system, for example.

However, with the technique described in JP 2008-220935 A, the ball density distribution information is created by observing a pattern of balls in the work area for a given period of time using a visual sensor, such as a camera, for monitoring the condition of the work area and another sensor for monitoring the number of balls collected in a designated range, for example. Thus, it would be impossible to acquire the correct actual position where each ball was picked up (i.e., the actual positional information on each ball) that is necessary for creating the ball density distribution information. In addition, although the position of the ball collector in the work area can be detected using a satellite positioning system and the like, a specific means of grasping the actual positional information on each ball using a satellite positioning system and the like is unknown.

Thus, as one of the specific measures, the present inventors consider providing the ball collector with a receiver having an antenna for receiving a positioning signal (e.g., a GPS signal) from a satellite of a satellite positioning system, and determining the positional information (i.e., latitude and longitude information) on the ball collector at a time point when a ball has touched the count sensor and a signal (i.e., level) from the count sensor has thus exceeded a predetermined threshold, that is, a time point when a ball is recognized as having been picked up, as the actual position where the ball was picked up, based on the received positioning signal (e.g., the GPS signal).

However, the positional information on the ball collector at a time point when a ball has touched the count sensor and the ball is thus recognized as having been picked up is away from the actual position where the ball was picked up. That is, the ball collector moves not a little from the time the ball has been picked up from the ground by the ball collection wheel until the ball has touched the count sensor, which means that the positional information on the ball collector includes an error corresponding to the movement distance of the ball collector in its traveling direction.

In view of the foregoing, exemplary embodiments relate to providing a highly reliable, cost-effective traveling collector that can determine the positions of fallen objects, such as balls, on the ground using a simple method, or determine the correct positions of fallen objects, such as balls, on the ground only by improving software and without the need for significant changes to hardware.

Accordingly, a traveling collector according to the present invention is basically a traveling collector for picking up and collecting fallen objects scattered on a surface while traveling on the surface, including a collection member adapted to pick up fallen objects from the surface; a controller configured to perform traveling control of the traveling collector on the surface, and acquire information on a position of the traveling collector detected by a positioning system; and a sensor for detecting that each fallen object picked up by the collection member has been collected, at the position detected by the positioning system.

In a preferred aspect, the controller is configured to determine an actual position where each fallen object was picked up using a movement distance of the traveling collector from a time the fallen object was picked up from the surface by the collection member till the fallen object was detected by the sensor, or using a length of time taken for the fallen object to be detected by the sensor after having been picked up from the surface by the collection member, and store information on the determined actual position.

In another preferred aspect, the controller is configured to determine a position that is obtained by reflecting, based on the information on the position of the traveling collector at a time point when the fallen object was detected by the sensor, the movement distance of the traveling collector from the time the fallen object was picked up from the surface by the collection member till the fallen object was detected by the sensor in a direction opposite to a traveling direction of the traveling collector at that time, as the actual position where each fallen object was picked up.

In still another preferred aspect, the controller is configured to determine a position of the traveling collector at a time point earlier than a time point when the fallen object was detected by the sensor by the length of time taken for the fallen object to be detected by the sensor after having been picked up from the surface by the collection member, as the actual position where each fallen object was picked up, based on the information on the position of the traveling collector.

In further another preferred aspect, the controller is configured to determine the length of time by dividing the movement distance of the traveling collector from the time the fallen object was picked up from the surface by the collection member till the fallen object was detected by the sensor by a traveling speed of the traveling collector at that time.

In further another preferred aspect, the sensor is a contact-type sensor configured to detect a fallen object picked up by the collection member when the fallen object has touched the sensor, and the controller is configured to determine an actual position where the fallen object was picked up using a movement distance of the traveling collector from a time the fallen object was picked up from the surface by the collection member till the fallen object touched the sensor, or using a length of time taken for the fallen object to touch the sensor after having been picked up from the surface by the collection member.

In further another preferred aspect, the controller is configured to send to a management server for the traveling collector information on the actual position where the fallen object was picked up.

In further another preferred aspect, the controller is configured to acquire the information on the position of the traveling collector by receiving a positioning signal from a satellite of a satellite positioning system.

In further another preferred aspect, the collection member is adapted to pick up fallen objects from a surface by rolling on the surface as the traveling collector travels on the surface.

In further another preferred aspect, the collection member has multiple elongated grooves including a number of annular grooves on an outer circumference of the collection member, each annular groove has a number of pockets formed along a circumferential direction for picking up fallen objects on a surface, and the pockets of the adjacent annular grooves are provided such that the pockets are displaced from each other by a predetermined angle in the circumferential direction.

In further another preferred aspect, the sensor includes a single sensor disposed across all of the annular grooves.

In further another preferred aspect, the traveling collector further includes a pectinate releasing member arranged in a manner protruding into each of the annular grooves so as to release fallen objects picked up by the collection member from the collection member, in which the sensor is disposed on the releasing member.

In further another preferred aspect, the sensor is a count sensor for counting fallen objects picked up by the collection member.

A more specific aspect of the traveling collector according to the present invention is basically a traveling collector for picking up and collecting balls scattered on a surface while traveling along a traveling path set on the surface in accordance with a predetermined program, including a ball collection wheel adapted to pick up balls from the surface by rolling on the surface; a sensor for detecting that each ball picked up by the ball collection wheel has been collected; and a controller configured to perform traveling control of the traveling collector on the surface, and acquire information on a position of the traveling collector detected by a positioning system, in which the controller is configured to determine an actual position where each ball was picked up using a movement distance of the traveling collector from a time the ball was picked up from the surface by the ball collection wheel till the ball was detected by the sensor, or using a length of time taken for the ball to be detected by the sensor after having been picked up from the surface by the ball collection wheel, and store information on the determined actual position on each ball.

The traveling collector according to the present invention has a sensor including, for example, a count sensor for detecting the position of each collected fallen object (e.g., a ball) at a position detected by a satellite positioning system, for example. Therefore, it is possible to determine the position of each fallen object, such as a ball, on the ground using a simple method. Specifically, the actual position where each fallen object (e.g., each ball) was picked up is determined using, for example, the movement distance of the traveling collector from the time the fallen object (e.g., the ball) was picked up from a surface by a collection member (i.e., a ball collection wheel) till the fallen object was counted by the count sensor, or using the length of time taken for the fallen object (e.g., the ball) to be counted by the count sensor after having been picked up from the surface by the collection member (i.e., the ball collection wheel). Then, information on the thus determined actual position is stored. For example, the actual position where each fallen object (e.g., a ball) was picked up is determined by reflecting (subtracting), based on the positional information on the traveling collector at a time point when the fallen object (e.g., the ball) was counted by touching the count sensor, the movement distance of the traveling collector from the time the fallen object (e.g., the ball) was picked up from the surface by the collection member (i.e., the ball collection wheel) till the fallen object was counted by touching the count sensor in a direction opposite to the traveling direction of the traveling collector at that time. Alternatively, for example, the positional information on the traveling collector at a time point earlier than the time point when the fallen object (e.g., the ball) was counted by touching the count sensor by the length of time taken for the fallen object (e.g., the ball) to be counted by touching the count sensor after having been picked up from the surface by the collection member (i.e., the ball collection wheel) is obtained. Then, the thus obtained positional information is determined as the actual position where each fallen object (e.g., each ball) was picked up. Therefore, it is possible to provide a highly reliable, cost-effective traveling collector that can determine the correct position of each fallen object, such as a ball, on the ground only by improving software and without the need for significant changes to hardware.

In addition, since the correct positions of balls and the like can be determined, it is possible to grasp the correct scattering (i.e., distribution) state of the balls, the correct dense areas of the balls, and the like. Consequently, a ball collection operation can be performed more efficiently.

DETAILED DESCRIPTION OF THE PREFERRED EMBODIMENTS

Hereinafter, embodiments of the present invention will be described with reference to the drawings.

Figure 1:
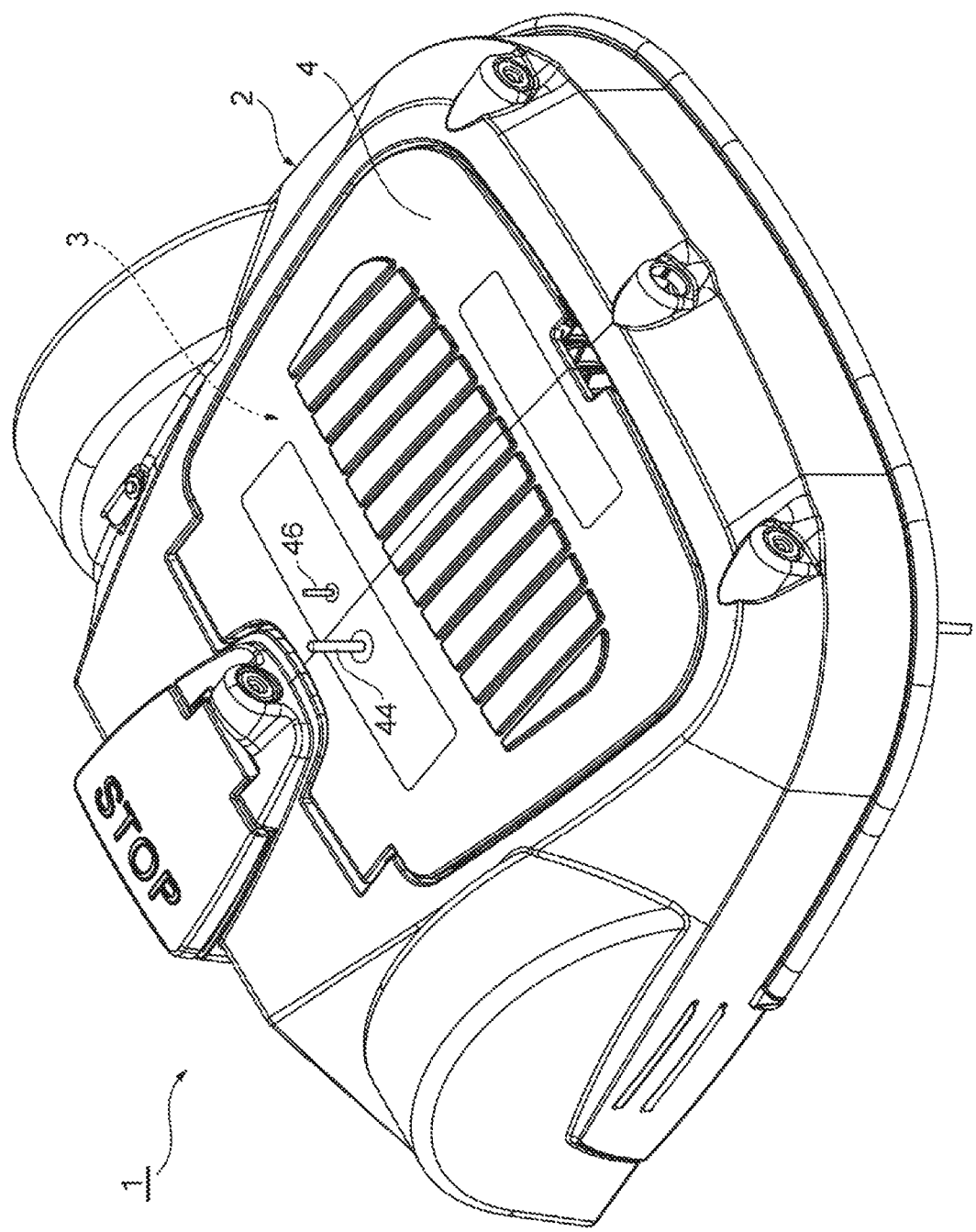
FIG. 1 is an overall perspective view of an embodiment of a ball collector as a traveling collector according to the present invention.

FIG. 1 is an overall perspective view of an embodiment of a ball collector as a traveling collector according to the present invention.

A ball collector 1 illustrated in FIG. 1 is an unmanned autonomous ball collector and is adapted to collect balls on the ground where a number of balls are scattered while traveling on the ground. The ball collector 1 is typically used for collecting a number of golf balls scattered on the ground of a golf driving range. The ball collector 1 includes a body cover 2 with an opening facing downward. The body cover 2 covers a collector body 3.

The body cover 2 (or a ball collection wheel cover 4 in the example illustrated in FIG. 1) is provided with a receiver 44 having an antenna for receiving a positioning signal (e.g., a GPS signal) from a satellite of a satellite positioning system, and a wireless communication device 46, provided in the vicinity of the receiver 44, for connecting the ball collector 1 to a management server 70 (FIGS. 9 and 10) via a wireless network (e.g., a wireless LAN).

In addition, a controller 50 (described in detail later) that performs traveling control and the like is provided within the body cover 2. The controller 50 is functionally provided with a positional information acquisition unit 54 (FIG. 10) that acquires positional information (i.e., latitude and longitude information) on the ball collector 1 based on a positioning signal (e.g., a GPS signal) received by the receiver 44.

Although a satellite positioning system is used herein so that the positional information on the ball collector 1 is acquired by receiving a positioning signal (e.g., a GPS signal) from a satellite of the satellite positioning system, the method of acquiring the positional information on the ball collector 1 is not limited thereto. For example, a position detection device, such as a camera, may be disposed as a positioning system in a work area where the ball collector 1 is used so that the positional information on the ball collector 1 in the work area is acquired (or detected) using a signal (e.g., a captured image) from the position detection device.

Figure 2:
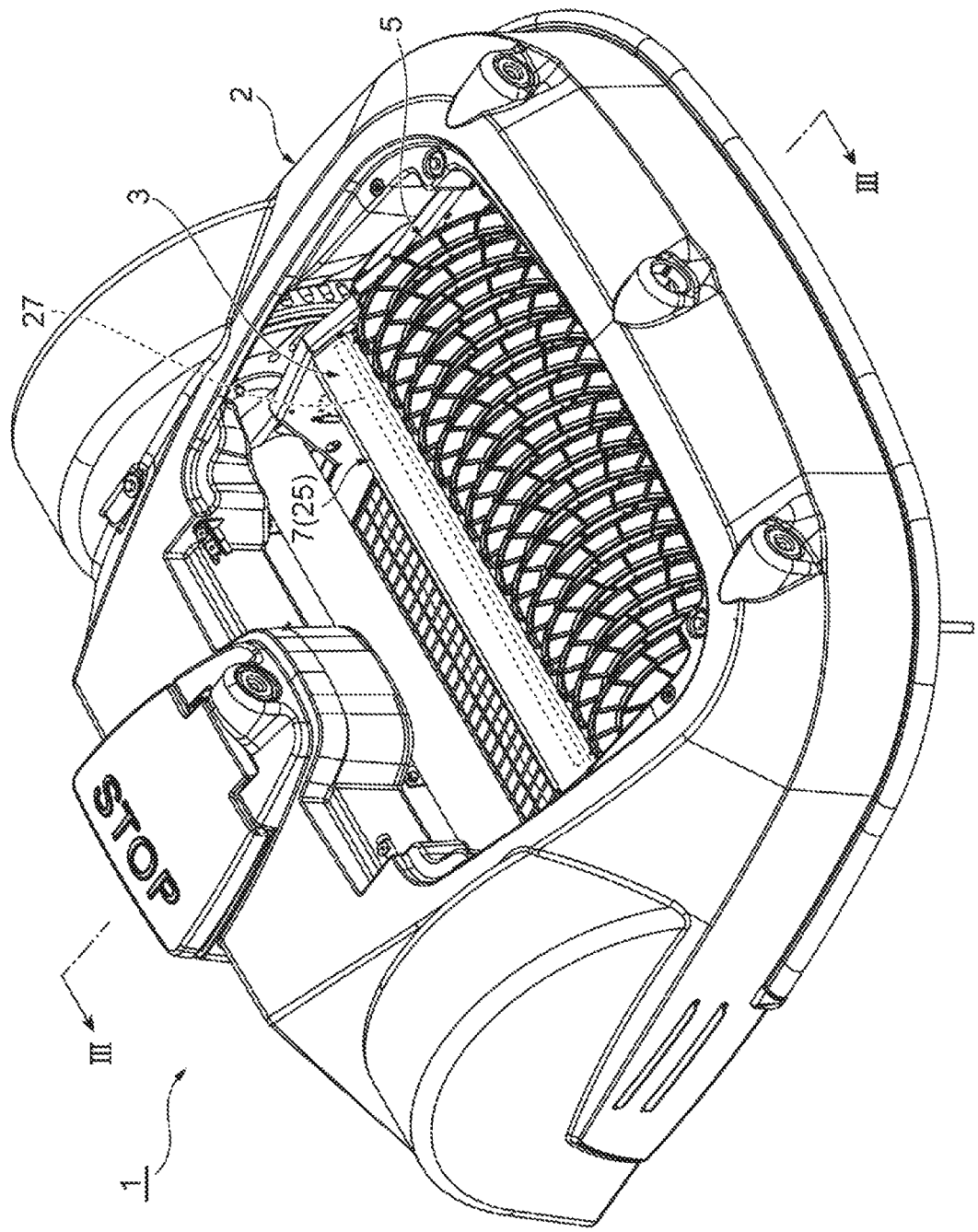
FIG. 2 is a perspective view of a state in which a ball collection wheel cover is detached from the ball collector of FIG. 1.

FIG. 2 illustrates a state in which the ball collection wheel cover 4 on the body cover 2 is detached from the ball collector 1 of FIG. 1. The ball collection wheel cover 4 is detachable from the body cover 2. Such a configuration is convenient to perform maintenance of a ball collection wheel 5 because the ball collection wheel 5 appears once the ball collection wheel cover 4 is detached.

Figure 3:
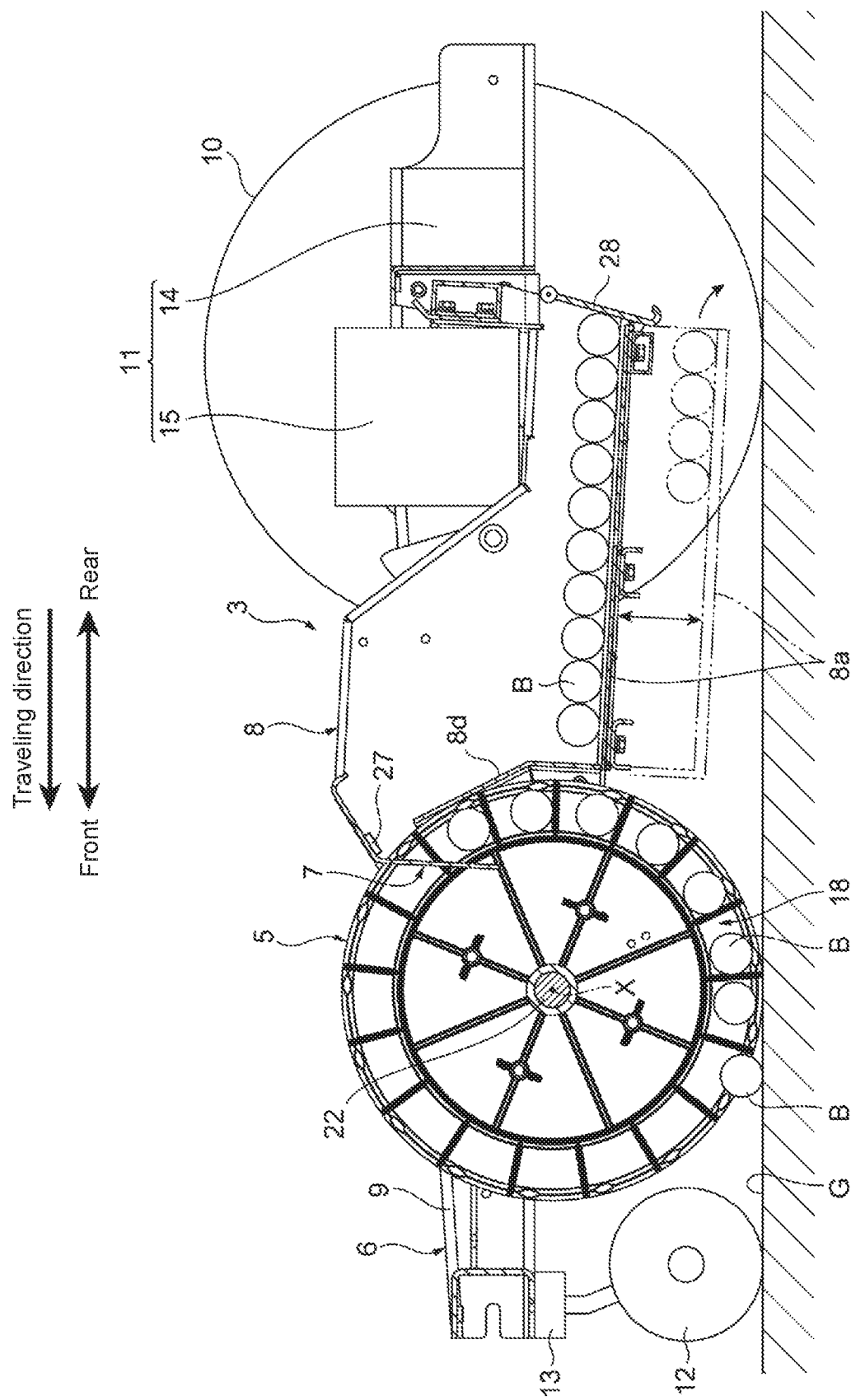
FIG. 3 is a cross-sectional view in the direction of the arrows in FIG. 2 with a body cover of the ball collector omitted.

As illustrated in FIG. 3, the collector body 3 includes a traveling body 6 as a body movable on the ground, the ball collection wheel 5, a ball releasing member (also referred to as a squeezer) 7, and a collection tank 8.

As illustrated in FIG. 3, the traveling body 6 includes a frame 9, a pair of right and left drive wheels 10 disposed on the rear of the frame 9, a drive unit 11 that drives the drive wheels 10, a pair of right and left steering wheels 12 disposed on the front of the frame 9, and a steering adjustment unit 13 that controls the steering wheels 12, for example. The drive unit 11 includes a storage battery 14 as a power supply, and drive motors 15 for the right and left drive wheels 10 that are supplied with power from the storage battery 14. As the drive wheels 10 are rotationally driven by the drive unit 11, the traveling body 6 moves and is automatically controlled in accordance with a predetermined program, whereby the traveling direction of the traveling body 6 is automatically changed so that the traveling body 6 can travel across the entire area necessary for collecting balls.

The ball collection wheel 5 is disposed between the pair of steering wheels 12 and the pair of drive wheels 10 in the front-rear direction of the ball collector 1. The ball collection wheel 5 is rotatable about the axis X extending in the right-left direction of the traveling body 6, and is supported by the frame 9 such that the outer peripheral face of the ball collection wheel 5 is always in contact with the ground G under its own weight. The ball collection wheel 5 collects a number of balls B scattered on the ground G while rolling on the ground G as the traveling body 6 moves forward.

Figure 4:
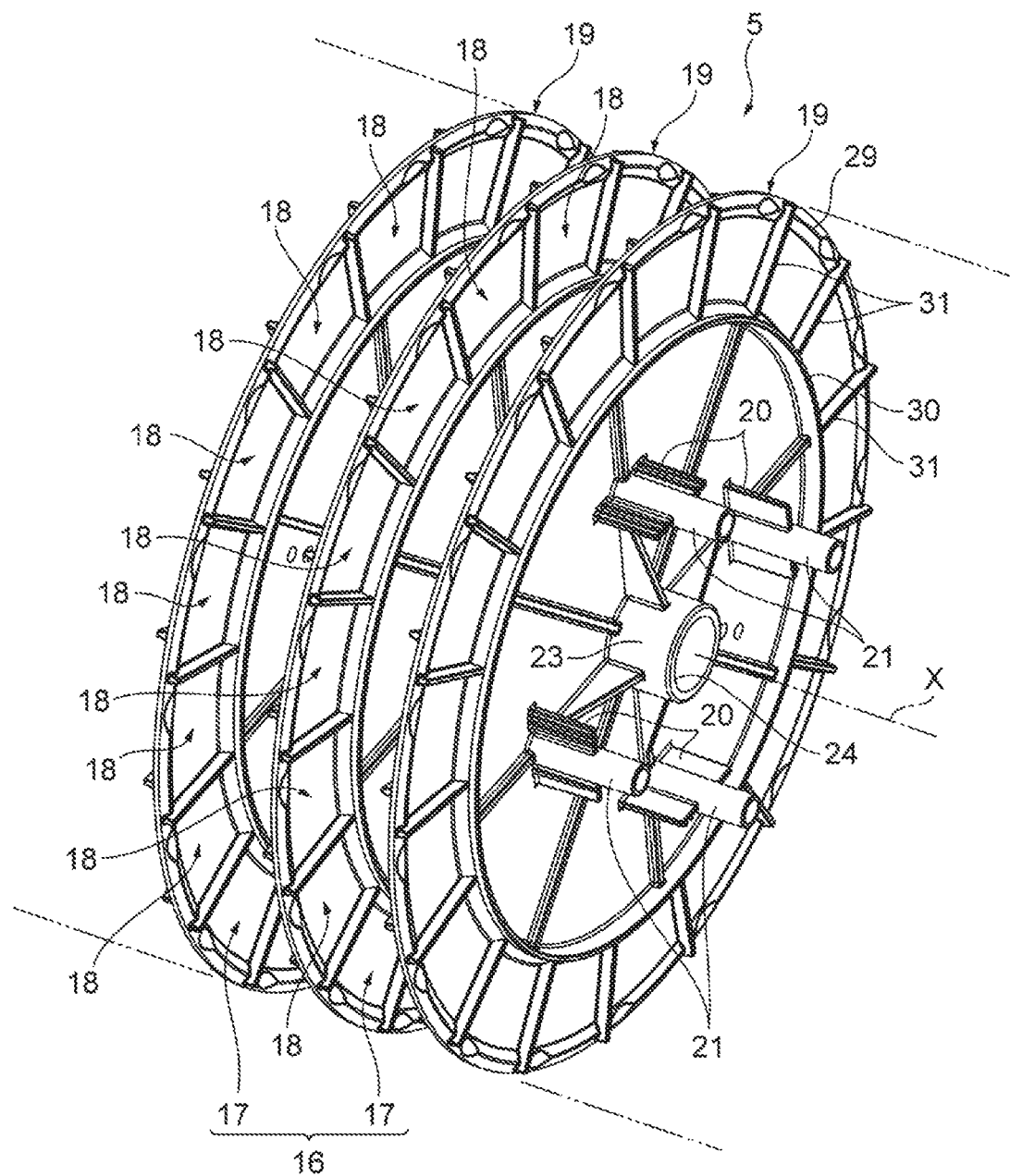
FIG. 4 is a partially enlarged perspective view of a ball collection wheel in FIG. 2.

As illustrated in FIG. 4, the ball collection wheel 5 has on its outer circumference multiple elongated grooves 16 in annular shapes (including a number of annular grooves 17). The annular grooves 17 forming the multiple elongated grooves 16 have ball pockets 18, continuously formed therein in the circumferential direction, for allowing entry and exit of balls B due to their elasticity. Each ball pocket 18 has a size capable of holding only one ball B as illustrated in FIG. 3. In addition, the ball pockets 18 of the adjacent annular grooves 17 are formed such that they are displaced from each other by a predetermined angle in the circumferential direction of the annular grooves 17.

As seen in FIG. 4, the ball collection wheel 5 is formed by an aggregate of a number of discs 19 with an identical configuration, and the annular grooves 17 are formed at equal intervals between the adjacent discs 19. Each disc 19 has on one face a plurality of attachment shaft portions 21 each having a spacer 20, and has on the other face shaft portion receiving holes (not illustrated) for receiving the attachment shaft portions 21. The attachment shaft portions 21 and the shaft portion receiving holes of the adjacent discs 19 are coupled together so that a number of discs 19 are integrated at equal intervals. The annular grooves 17 are formed by the spacers 20 between the adjacent discs 19. Each disc 19 has formed at its center a boss portion 23 for receiving a support shaft 22 (see FIG. 3), and an aggregate of the boss portions 23 form a support-shaft insertion hole 24 in the ball collection wheel 5. The support shaft 22 (see FIG. 3) that is inserted through the support-shaft insertion hole 24 is rotatably supported by the frame 9.

Figure 5:
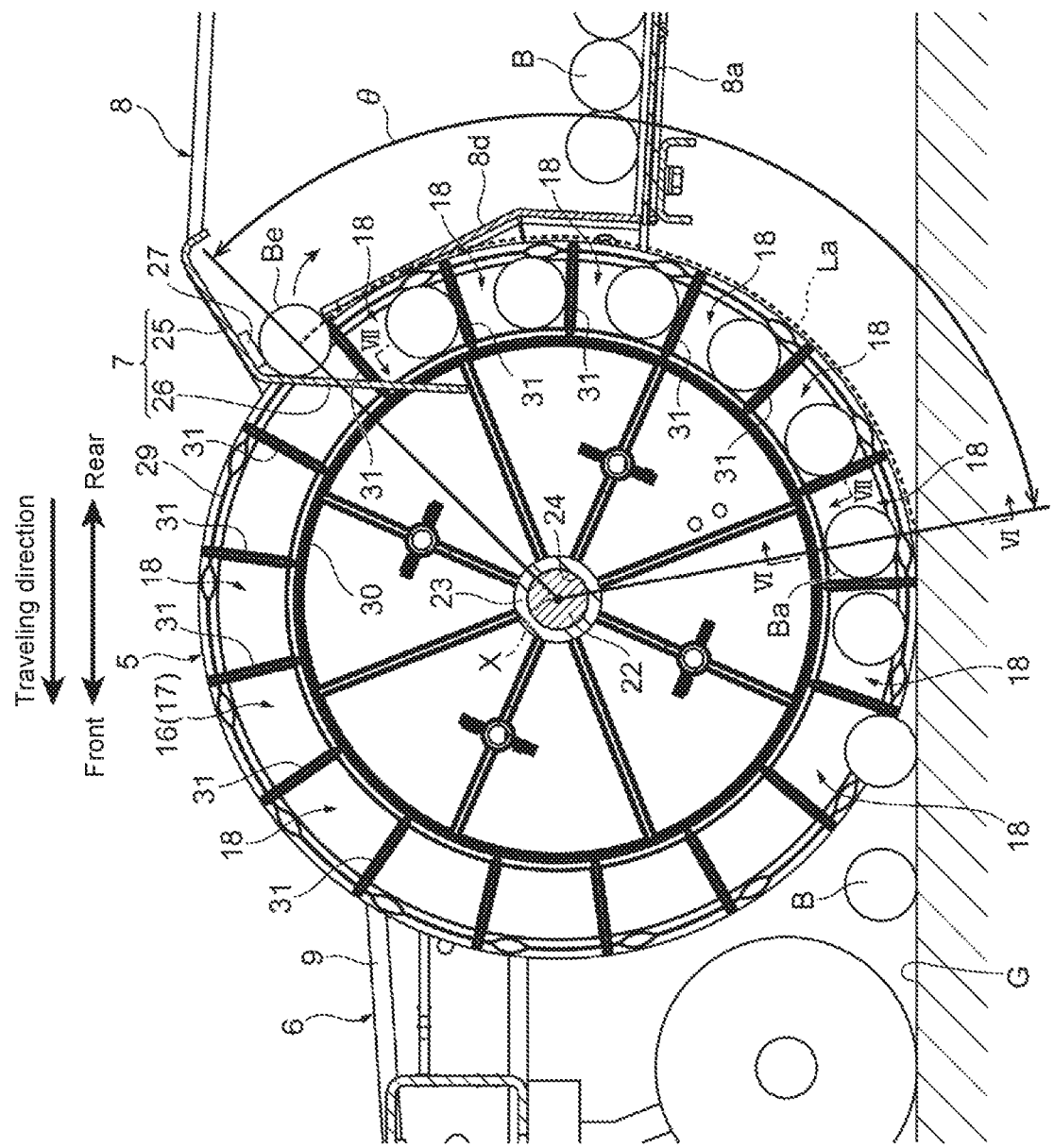
FIG. 5 is an enlarged cross-sectional view of a ball collection wheel in FIG. 3.

As illustrated in FIG. 5, the frame 9 of the traveling body 6 has the ball releasing member (i.e., the squeezer) 7 fixed thereto. The ball releasing member 7 is adapted to work in conjunction with elongated partitioning protrusions 31, which define the ball pockets 18, as described below so as to forcibly release balls B in the ball pockets 18 at a predetermined angular position on the outer circumference of the ball collection wheel 5.

Figure 8:
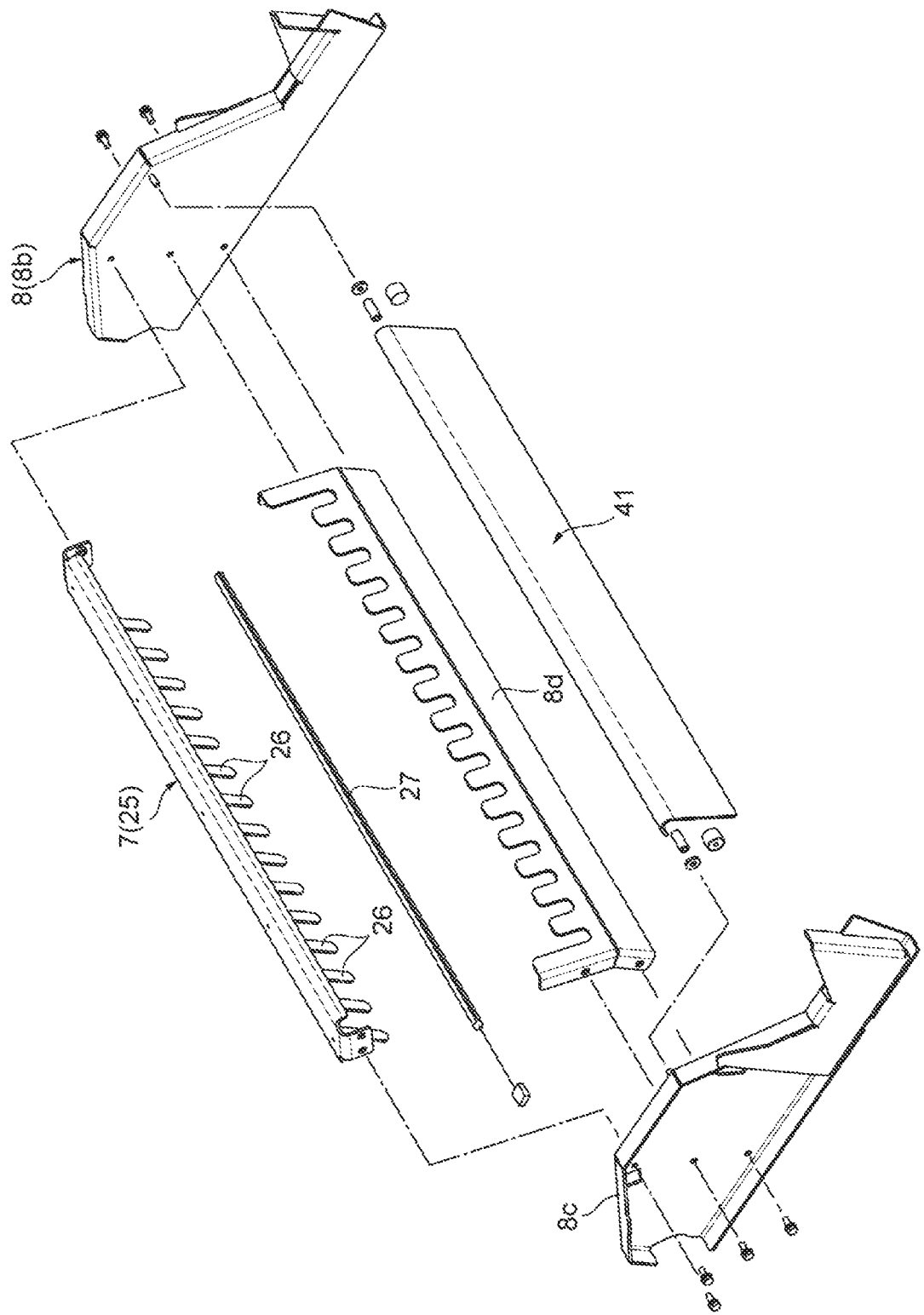
FIG. 8 is an exploded perspective view illustrating the details of a portion including a count sensor and a ball releasing member in FIG. 3.

As can be seen in FIG. 8 in addition to FIG. 5, the ball releasing member 7 is a pectinate member as a whole, and includes a proximal portion 25 extending in the right-left direction of the traveling body 6, and a number of ball releasing protrusions 26 extending from the proximal portion 25 in parallel at equal intervals. The gap between the ball releasing protrusions 26 is identical to the gap between the discs 19 (that is, the annular grooves 17) of the ball collection wheel 5. The proximal portion 25 of the ball releasing member 7 is fixed to the frame 9 around a position above the ball collection wheel 5, and each ball releasing protrusion 26 protrudes into each annular groove 17 of the ball collection wheel 5. That is, the pectinate ball releasing member 7 is disposed such that it protrudes into each of the annular grooves 17 forming the multiple elongated grooves 16.

The lower face of the proximal portion 25 of the ball releasing member 7 has a contact-type count sensor 27, which counts the number of balls B released from the ball pockets 18 by the ball releasing protrusions 26, fixed thereto by a method such as bonding. The count sensor 27 includes a single elongated plate-like pressure sensor for which a piezoelectric element is used. The count sensor 27 extends in the right-left direction along the proximal portion 25 of the ball releasing member 7 and across each of (all) the annular grooves 17, and has a length corresponding to the length of the ball collection wheel 5 in the axial direction. The count sensor 27 is disposed on the trajectories of balls B that are guided in the radial direction of the ball collection wheel 5 (or the discs 19 thereof) by the ball releasing protrusions 26 of the ball releasing member 7 and the elongated partitioning protrusions 31. Therefore, the balls B released from the ball collection wheel 5 by the ball releasing member 7 surely touch the count sensor 27. Accordingly, the balls B are accurately counted by the count sensor 27.

Although the count sensor 27 in the present embodiment includes a single pressure sensor disposed across each of (all) the annular grooves 17, the count sensor 27 may include individual (a plurality of) pressure sensors disposed corresponding to the respective annular grooves 17. In addition, the count sensor 27 may be disposed at a portion other than the ball releasing member 7.

As illustrated in FIGS. 3, 5, and 8, the collection tank 8, which includes a bottom plate 8a, side plates 8b and 8c, and a front plate 8d, for example, is disposed behind the ball releasing member 7. The side plates 8b and 8c of the collection tank 8 are supported by the frame 9 of the traveling body 6, and accommodate balls B that are released from the ball collection wheel 5 by the ball releasing member 7. As illustrated in FIG. 3, the bottom plate 8a of the collection tank 8 is attached in a manner translatable in the vertical direction. When the bottom plate 8a is moved to a ball discharge position at a lower level, a gap is produced between the bottom plate 8a of the collection tank 8 and a back plate 28 so that balls B are discharged through the gap. In addition, a full tank detector 41 for detecting that the collection tank 8 is full of a plurality of collected balls B is provided (swingably) on the collection tank 8 (see FIG. 8).

Figure 6:
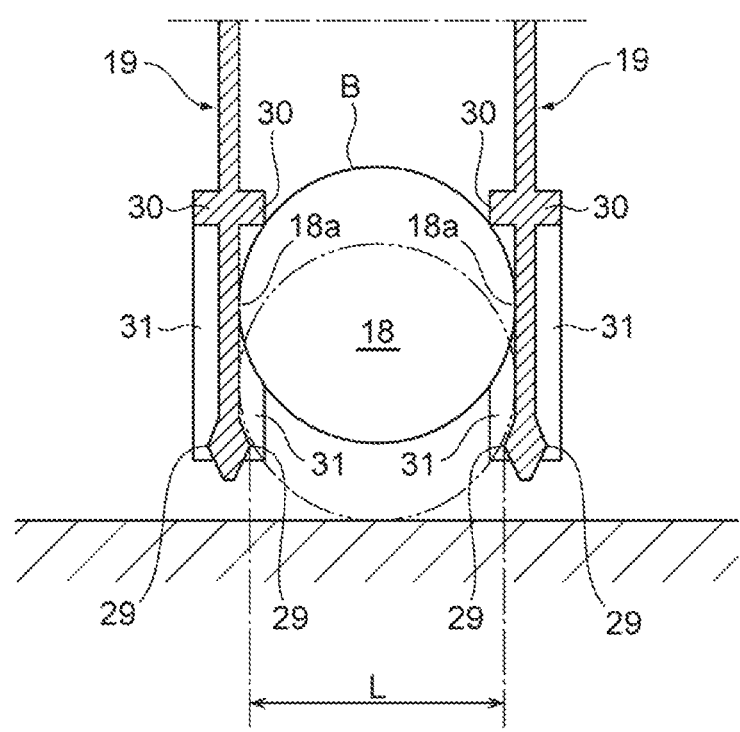
FIG. 6 is a cross-sectional view in the direction of the arrows VI-VI in FIG. 5.
Figure 7:
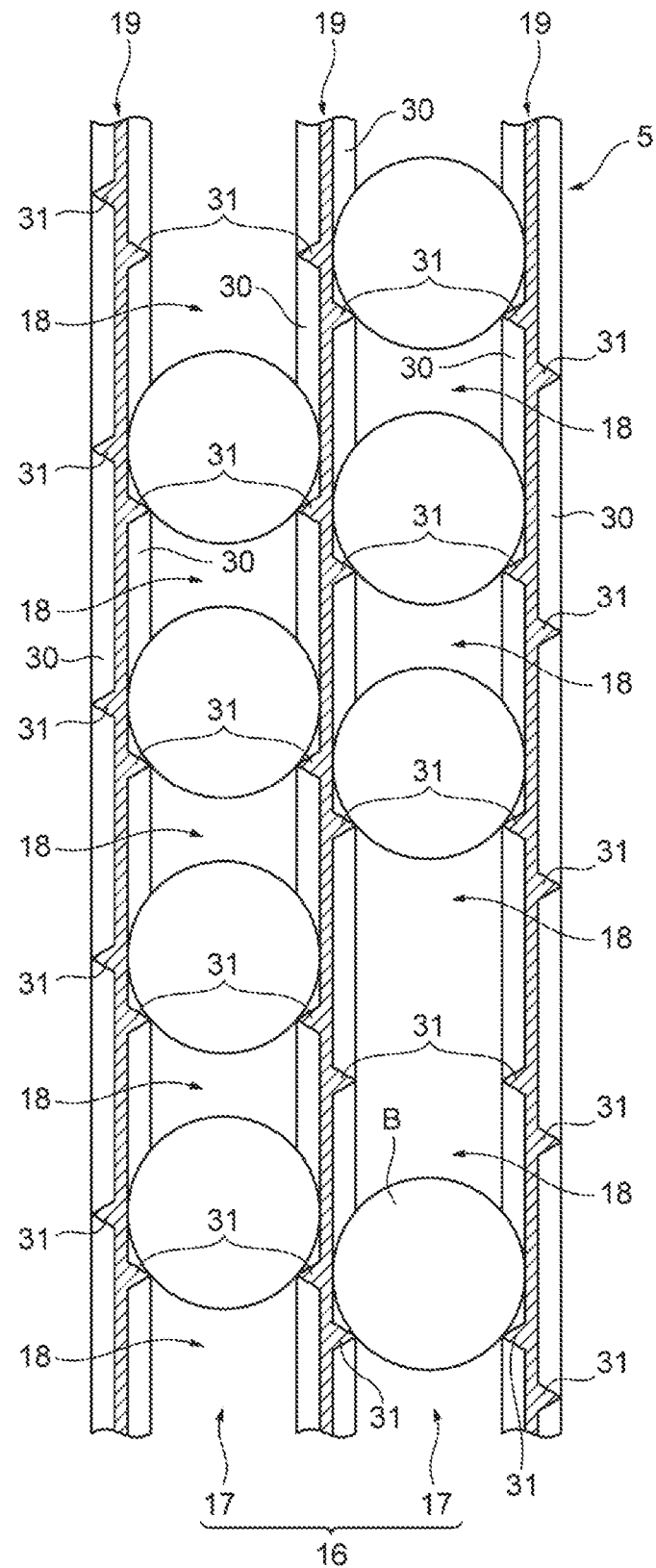
FIG. 7 is a planar developed view of a part of a cross-section of a VII-VII arrow portion in FIG. 5 along the circumferential direction.

As can be seen in FIGS. 4, 6, and 7, opposite faces of each disc 19 of the ball collection wheel 5 have formed thereon outer elongated protrusions 29 extending in the circumferential direction, inner elongated protrusions 30 similarly extending in the circumferential direction, and the elongated partitioning protrusions 31 extending in the radial direction between the outer elongated protrusions 29 and the inner elongated protrusions 30. The annular grooves 17 whose bottoms are defined by the inner elongated protrusions 30 are formed between the adjacent discs 19, and the ball pockets 18, shaped like fans, are compartmentally formed in the annular grooves 17 by the outer elongated protrusions 29, the inner elongated protrusions 30, and the elongated partitioning protrusions 31. Each of the outer elongated protrusions 29, the inner elongated protrusions 30, and the elongated partitioning protrusions 31 also has a function of a rib for providing each disc 19 in a thin plate shape with a strength necessary to serve as the ball collection wheel 5.

As described previously, each ball pocket 18 has a size capable of holding only one ball B. In addition, as illustrated in FIG. 6, inner faces 18a of each ball pocket 18 facing each other (i.e., side faces of the adjacent discs 19 facing each other) are flat faces, and the width of each ball pocket 18 is set so as to allow a ball B to move along the flat faces 18a within each ball pocket 18. Each disc 19 is formed using a material with a light weight and excellent durability, such as plastic, and has an elastic deformation property at least at its portion radially outward of the inner elongated protrusions 30. The elastic deformation property of each disc 19 allows a ball B to enter or exit from each ball pocket 18 and to be held therein.

As illustrated in FIG. 6, the outer elongated protrusions 29 protrude outward from the outer peripheral edge of each disc 19 in the thickness direction of the disc 19. The outer elongated protrusions 29 define an entrance/exit portion of each ball pocket 18 from which each ball B is unlikely to fall. The protruding heights of the outer elongated protrusions 29 are set so as to allow the gap L between the outer elongated protrusions 29 of the adjacent discs 19 to be a little smaller than the diameter of each ball B. Accordingly, the elastic deformation property of the discs 19 allows a ball B to enter or exit from each ball pocket 18 through the gap between the outer elongated protrusions 29, and allows the ball B, which has once entered the ball pocket 18, to be held therein unless a forcibly releasing action of the ball releasing member 7 is applied thereto.

Likewise, as illustrated in FIG. 6, the inner elongated protrusions 30 are formed on the radially inner side of each disc 19 so as to have about the same length as the diameter of each ball from the outer elongated protrusions 29. The inner elongated protrusions 30 protrude outward from the side faces of each disc 19 in the thickness direction thereof. The inner elongated protrusions 30 define the bottom of each ball pocket 18. Accordingly, there is no strict restriction on the heights of the inner elongated protrusions 30 like the outer elongated protrusions 29, and it is acceptable as long as the inner elongated protrusions 30 are high enough to form a gap, which allows each ball releasing protrusion 26 of the ball releasing member 7 to protrude thereinto, between the inner elongated protrusions 30 of the adjacent discs 19.

As illustrated in FIGS. 4 and 5, the elongated partitioning protrusions 31 extend in the radial direction between the outer elongated protrusions 29 and the inner elongated protrusions 30, and partition each annular groove 17 at equal angular intervals in the circumferential direction, thereby defining the ball pockets 18. In the example illustrated in FIGS. 4 and 5, each annular groove 17 is partitioned into 17 ball pockets 18 by the elongated partitioning protrusions 31. The number of ball pockets 18 in each annular groove 17 is not limited to a particular number. However, each ball pocket 18 should have a size capable of holding only one ball B so that it can surely release the ball B by working in conjunction with the ball releasing member 7 and the elongated partitioning protrusions 31.

As illustrated in FIG. 7, the ball pockets 18 of the adjacent annular grooves 17 are formed such that they are displaced from each other by a predetermined angle in the circumferential direction of the annular grooves 17. In the example illustrated in FIG. 7, the elongated partitioning protrusions 31, which are formed on the opposite faces of each disc 19 at equal angular intervals, are provided such that they are displaced from each other by a predetermined angle in the circumferential direction on the opposite faces of each disc 19. Therefore, as illustrated in FIG. 7, when a number of discs 19 with an identical configuration are aggregated so that the positions of the elongated partitioning protrusions 31 facing each other of the adjacent discs 19 coincide in the circumferential direction, it is possible to allow the ball pockets 18 of the adjacent annular grooves 17 to be displaced from each other by a predetermined angle in the circumferential direction of the annular grooves 17. This can simplify the production of the ball collection wheel 5.

As illustrated in FIG. 5, when the traveling body 6 moves forward, the ball collection wheel 5, which is rotatable and is always in contact with the ground G, rotates in a counterclockwise direction as seen in FIG. 5. Accordingly, a number of balls B scattered on the ground G enter the ball pockets 18 and are heled therein due to the elastic deformation property of the ball pockets 18 (that is, the balls B on the ground are picked up). The balls B held in the ball pockets 18 are transferred upward with the rotation of the ball collection wheel 5 along with the forward movement of the traveling body 6, and are then pushed against the ball releasing protrusions 26 of the ball releasing member 7. Then, with a further rotation of the ball collection wheel 5, the balls B in the ball pockets 18 are guided upward along the elongated partitioning protrusions 31 at the rear portion of the ball collection wheel 5 in the rotation direction. Then, after touching the count sensor 27 attached to the lower face of the proximal portion 25 of the ball releasing member 7, the balls B are sent to the collection tank 8 and fall therein.

It should be noted that the collector body 3 is provided with a mechanism (not illustrated) for supporting the ball collection wheel 5 while elevating it from the ground. When the aforementioned ball collecting operation is not performed, such as when the collection tank 8 has become full and returns to a station 65 (FIG. 9) or during a change in the direction, such as a U-turn, for example, the ball collection wheel 5 is elevated from the ground.

Since the ball collector 1 of the present embodiment is configured such that the ball pockets 18 of the adjacent annular grooves 17 of the ball collection wheel 5 are displaced from each other by a predetermined angle in the circumferential direction of the annular grooves 17, balls B are held in the ball pockets 18 of the adjacent annular grooves 17 at positions displaced from each other by a predetermined angle in the circumferential direction of the annular grooves 17. Therefore, a circumstance that balls B are concurrently held at identical positions in the circumferential direction of the adjacent annular grooves does not occur. This can prevent a ball holding force from becoming too strong when the balls B are released from the ball pockets 18, and thus allow the balls B to be surely released by the ball releasing member 7.

In addition, since a circumstance that balls B are concurrently held at identical positions in the circumferential direction of all of a number of annular grooves 17 does not occur or is unlikely to occur, it is possible to avoid a circumstance that the ball releasing member releases a number of balls B at the same timing. Therefore, a problem that the rotation of the ball collection wheel 5 stops, for example, does not occur.

Further, as illustrated in FIG. 5, since the count sensor 27 is disposed on the trajectories of balls B that are guided in the radial direction of the discs 19 forming the annular grooves 17 by the ball releasing protrusions 26 of the ball releasing member 7 and the elongated partitioning protrusions 31, the balls B released from the ball collection wheel 5 by the ball releasing member 7 surely touch the count sensor 27. Therefore, the correct number of the collected balls B can be grasped. In addition, since the ball pockets 18 of the adjacent annular grooves 17 are located at positions displaced from each other by a predetermined angle in the circumferential direction of the annular grooves 17, balls B in the ball pockets 18 of the adjacent annular grooves 17 touch the count sensor 27 at different timings. Therefore, the balls B can be accurately counted by the count sensor 27.

In addition to the aforementioned configuration, the ball collector 1 of the present embodiment includes the controller 50 for which a microcomputer is used so as to perform traveling control, ball counting control, and correction of positional information on balls, for example. The controller 50 includes a CPU, an input/output circuit, and a storage unit (e.g., ROM, RAM, nonvolatile memory, HDD, and SDD). The storage unit stores programs and various data. By executing a predetermined program stored in the storage unit, the controller 50 functions as a desired functional processor for controlling autonomous travel or acquiring positional information, for example.

Figure 9:
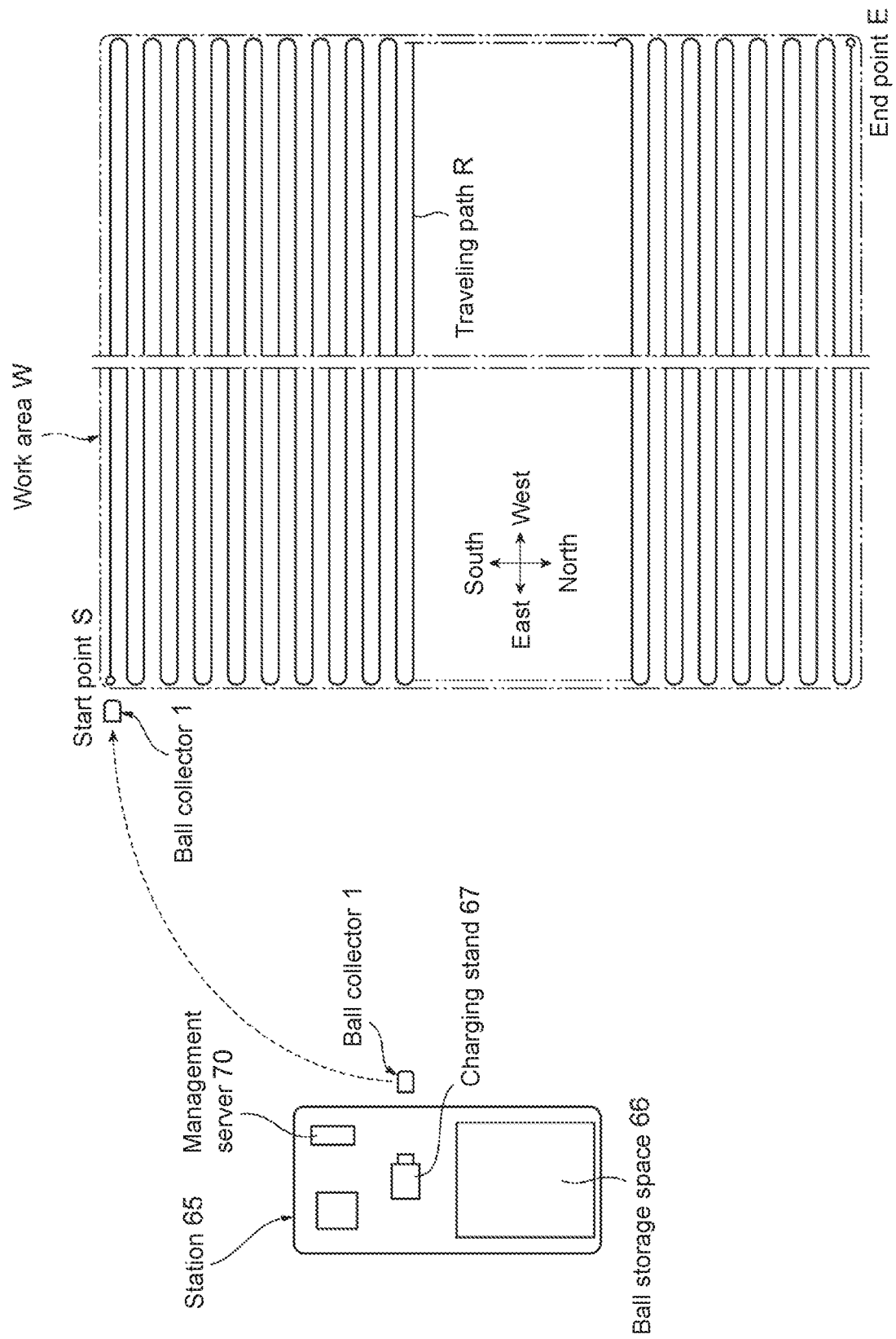
FIG. 9 is a schematic view illustrating a work area, a traveling path, a station, and the like in which the ball collector of FIG. 1 is used.

As FIG. 9 exemplarily illustrates a schematic view of a work area W, a traveling path R, and a station 65, for example, in which the ball collector 1 of FIG. 1 is used, the ball collector 1 of the present embodiment performs a ball collecting operation in accordance with a predetermined program by moving first to a predetermined start point S in the work area W (which is formed with an embedded wire, for example) after startup, and then traveling along the traveling path R set within the work area W from the start point S (e.g., traveling from east to west, turning upon reaching an end, and traveling from west to east while maintaining an interval of about less than the width of the ball collection wheel 5 in the north-south direction, and similarly, traveling across the entire work area W in a zig-zag manner up to an end point E). When a ball count (e.g., the number of balls counted) has reached a given number (i.e., when the collection tank 8 is estimated to have become full) during the ball collecting operation, the ball collector 1 stops the ball collecting operation and returns to the station 65 so as to unload the balls in the collection tank 8 into a predetermined ball storage space 66, and then resumes the ball collecting operation.

In the station 65, a charging stand 67 for charging the ball collector 1 is provided and the management server 70 is installed. The management server 70 is connected to the ball collector 1 via a wireless network (e.g., a wireless LAN) and also by a wire if required.

Hereinafter, an object of the present embodiment will be described with reference to FIG. 5.

A position (i.e., a ball Be) at a time point when a ball has touched the count sensor 27 and a signal (i.e., level) from the count sensor 27 has thus exceeded a predetermined threshold, that is, a time point when a ball is recognized as having been picked up based on a positioning signal (e.g., a GPS signal) from a satellite of a satellite positioning system is away from the actual position (i.e., a ball Ba) where the ball was picked up. That is, by the time a ball touches the count sensor 27 after having been picked up from the ground by the ball collection wheel 5, the ball collector 1 has moved by the length La of the outer circumferential arc of the ball collection wheel 5 corresponding to the central angle θ formed by the ball Ba—the support shaft 22—the ball Be. It follows that the positional information includes an error corresponding to the movement distance La of the ball collector 1 in its traveling direction.

It is a primary object of the present embodiment to correct the positional information on the ball collector 1 at a time point when a ball was counted by touching the count sensor 27, and thus acquire the actual position where the ball was picked up (i.e., the actual positional information on the ball).

Figure 10:
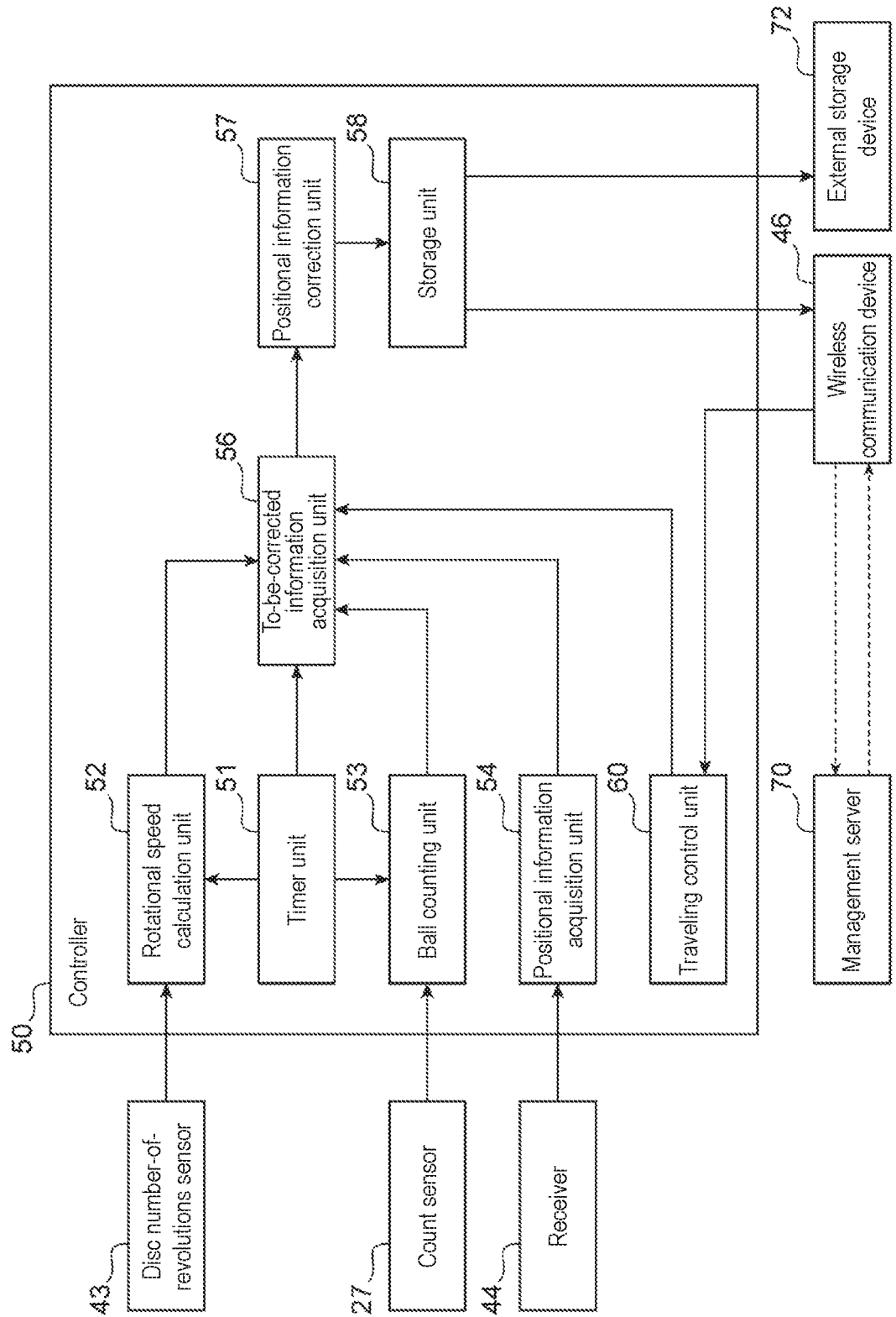
FIG. 10 is a functional block diagram used for illustrating a process of a controller provided in the ball collector of an embodiment.

To achieve the primary object, the controller 50 includes, as illustrated in a functional block of FIG. 10, a timer unit 51, a rotational speed calculation unit 52, a ball counting unit 53, a positional information acquisition unit 54, a to-be-corrected information acquisition unit 56, a positional information correction unit 57, a storage unit 58, and a traveling control unit 60.

The timer unit 51 starts timing when the controller 50 is powered ON (i.e., started), continuously measures the elapsed time while the controller 50 is ON, and terminates the timing when the controller 50 is powered OFF. The measurement unit of the timer unit 51 is 10 μs, for example. The elapsed time from when the controller 50 is started, corresponding to the "time," can be obtained from the timer unit 51 in units of one hundred-thousandth of a second.

The rotational speed calculation unit 52 calculates the rotational speed of the ball collection wheel 5 (or its equivalent traveling speed of the ball collector 1) based on a signal from the disc number-of-revolutions sensor 43 that detects the rotational speed of the discs 19, and sends the calculated rotational speed (or the traveling speed) to the to-be-corrected information acquisition unit 56.

The ball counting unit 53 determines if a signal from the count sensor (i.e., the pressure sensor) 27 has exceeded a predetermined threshold, and if so, determines that balls have been collected and thus counts the number of the collected balls, and then sends to the to-be-corrected information acquisition unit 56 information that the balls have been counted as well as the time point when the signal has exceeded the threshold.

The positional information acquisition unit 54 acquires the positional information on the ball collector 1 at predetermined time intervals (e.g., every one-hundredth of a second) based on a positioning signal (e.g., a GPS signal) received by the receiver 44, and sends the acquired positional information to the to-be-corrected information acquisition unit 56.

The to-be-corrected information acquisition unit 56 acquires information for correcting the positional information on the ball collector 1 at a time point when balls were counted by touching the count sensor 27, in order to determine the actual position where the balls were picked up. As the information for correcting the positional information on the ball collector 1, the following are used, for example: the movement distance La of the ball collector 1 from the time balls were picked up from the ground by the ball collection wheel 5 till the balls were counted by touching the count sensor 27; the length of time Ja taken for balls to be counted by touching the count sensor 27 after having been picked up from the ground by the ball collection wheel 5; positional information acquired from the positional information acquisition unit 54; the traveling direction of the ball collector 1; and the traveling speed of the ball collector 1 or the rotational speed of the ball collection wheel 5.

The positional information correction unit 57 corrects the positional information on the ball collector 1 at a time point when balls were counted by touching the count sensor 27, using the information acquired by the to-be-corrected information acquisition unit 56, thereby acquiring the actual position where the balls were picked up (i.e., the actual positional information on the balls described later).

The storage unit 58 stores the actual positional information on the balls corrected by the positional information correction unit 57, and sends the stored actual positional information on the balls to the management server 70 via the wireless communication device 46. The sending timing may be any of the following: each time a ball is collected, at a time when the ball collector 1 has returned to the station 65, and at a time when the operation has finished. It should be noted that the actual positional information on the balls may be stored in an external storage device 72, such as a memory card that is insertable into and removable from the controller 50, for example, other than being sent to the management server 70 for the ball collector 1 and stored therein as described above.

The traveling control unit 60 performs steering control of adjusting the rotational speed of the right and left drive motors 15 so that the ball collector 1 travels along the traveling path R set within the work area W in accordance with a predetermined program. In addition, upon receiving from the ball counting unit 53 information indicating that a ball count (e.g., the number of balls counted) has reached a given number, the traveling control unit 60 performs steering control of adjusting the rotational speed of the right and left drive motors 15, thereby causing the ball collector 1 to stop the ball collecting operation and return to the station 65 so as to unload the balls in the collection tank 8 into the predetermined ball storage space 66, and then resume the ball collecting operation. The traveling control unit 60 can also use the actual positional information on balls (or a ball density distribution map or a virtual work area described below) sent to the management server 70 for controlling the travel of the ball collector 1.

Next, an example (FIG. 11) and another example (FIG. 12) of a positional information correction routine will be described with reference to flowcharts. The routine is mainly executed by the positional information acquisition unit 54, the to-be-corrected information acquisition unit 56, and the positional information correction unit 57 of the controller 50.

Figure 11:
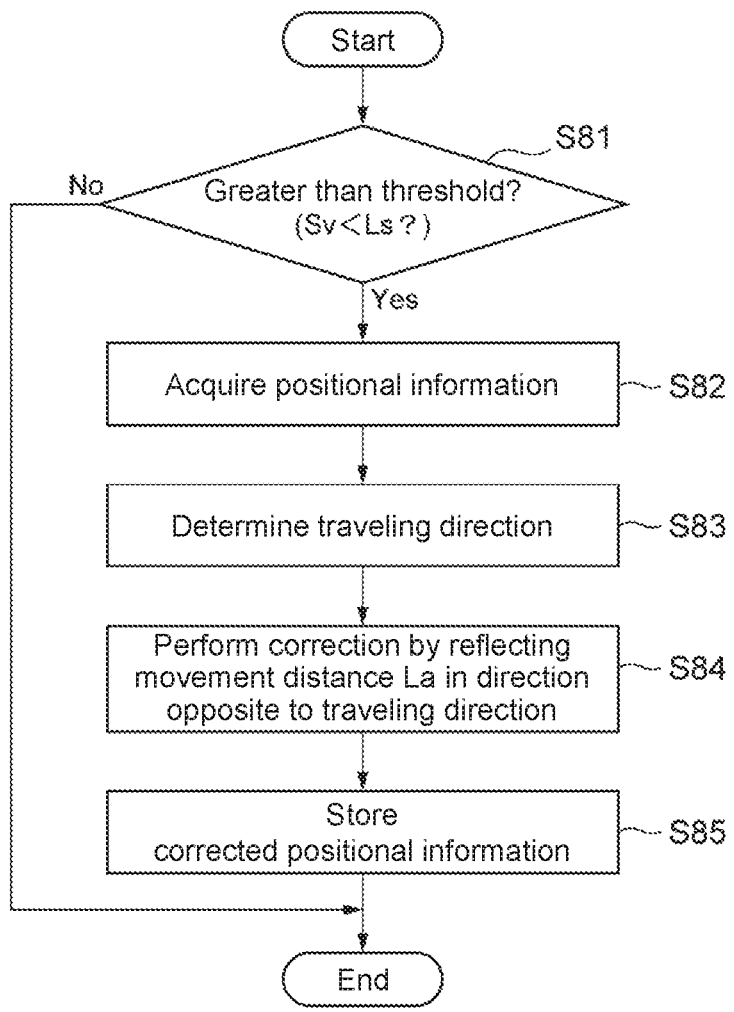
FIG. 11 is a flowchart illustrating an example of a positional information correction routine executed by the controller.
Figure 12:
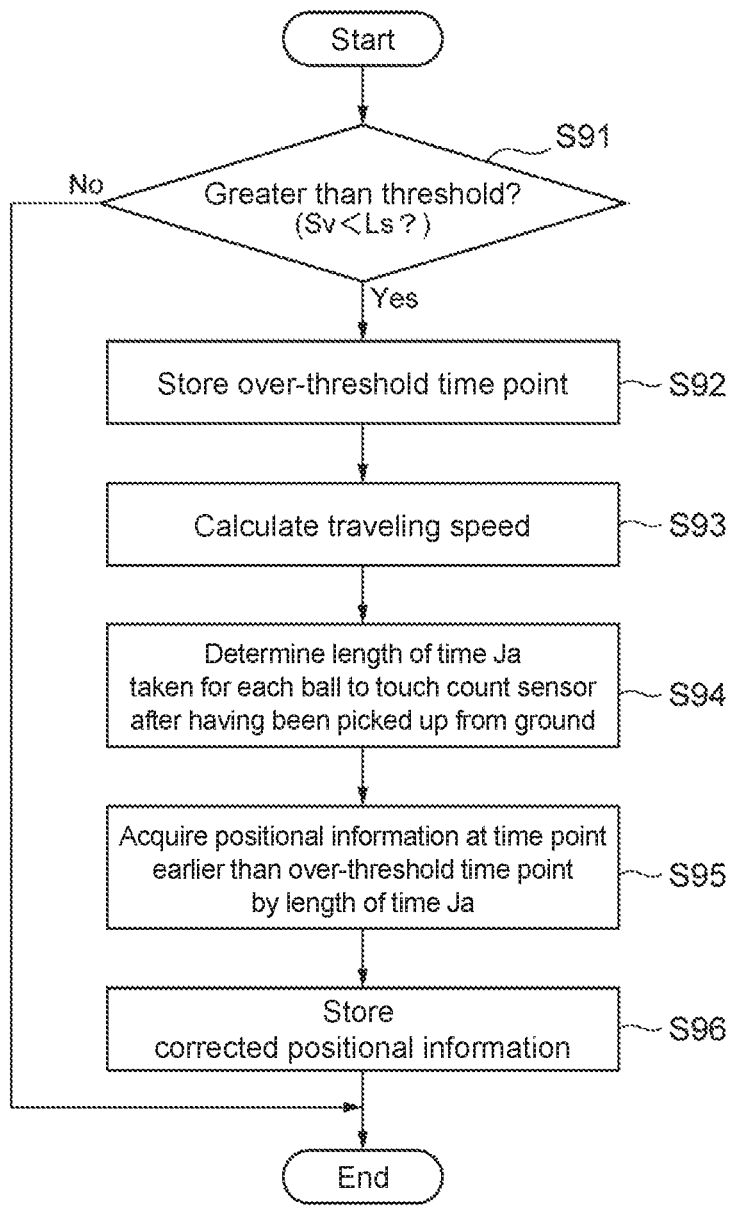
FIG. 12 is a flowchart illustrating another example of a positional information correction routine executed by the controller.

Each of the positional information correction routines illustrated in FIGS. 11 and 12 is started when the controller 50 is powered ON, and is repeatedly executed in predetermined cycles.

In the example of the positional information correction routine illustrated in FIG. 11, it is determined in step S81 if a signal Sv from the count sensor 27 has exceeded a predetermined threshold Ls (actually, if Sv has become less than Ls) after Start. If the signal Sv has not exceeded the threshold Ls, the flow ends, and if the signal Sv has exceeded the threshold Ls, the flow proceeds to step S82 so that positional information at a time point when the signal Sv has exceeded the threshold Ls, that is, a time point when a ball is recognized as having been picked up is acquired.

Next, in step S83, the traveling direction is determined based on a change in the positional information (i.e., latitude and longitude information), the current traveling path, and the steering condition, for example.

Next, in step S84, correction is performed by reflecting, based on the positional information at the time point when the ball is recognized as having been picked up obtained in step S82, the movement distance La of the ball collector 1 from the time each ball was picked up from the ground by the ball collection wheel 5 till the ball was counted by touching the count sensor 27 in the direction opposite to the traveling direction of the ball collector 1 at that time (e.g., returning the movement distance La to the east if the ball collector 1 has traveled to the west), thereby determining the actual position where each ball was picked up (i.e., the actual positional information on each ball). That is, the position of the ball collector 1, which is obtained by reflecting, based on the positional information on the ball collector 1 at the time point when the ball was counted by touching the count sensor 27, the movement distance La of the ball collector 1 from the time each ball was picked up from the ground by the ball collection wheel 5 till the ball was counted by touching the count sensor 27 in the direction opposite to the traveling direction of the ball collector 1 at that time, is determined as the actual position where each ball was picked up (i.e., the actual positional information on each ball).

In step S85, the actual positional information on each ball corrected in step S84 is stored, and the flow ends.

In another example of the positional information correction routine illustrated in FIG. 12, it is determined in step S91 if a signal Sv from the count sensor 27 has exceeded a predetermined threshold Ls (actually, if Sv has become less than Ls) after Start. If the signal Sv has not exceeded the threshold Ls, the flow ends, and if the signal Sv has exceeded the threshold Ls, the flow proceeds to step S92 so that a time point when the signal Sv exceeded the threshold Ls (i.e., an over-threshold time point) is stored.

Next, in step S93, the traveling speed of the ball collector 1 is calculated based on a signal from the disc number-of-revolutions sensor 43. It should be noted that the traveling speed may also be determined based on a change in the positional information (i.e., latitude and longitude information) or the steering condition, for example.

Next, in step S94, the length of time Ja taken for each ball to be counted by touching the count sensor 27 (i.e., the position of the ball Be) after having been picked up from the ground by the ball collection wheel 5 (i.e., the position of the ball Ba) is determined by dividing the movement distance La by the traveling speed calculated in step S93 (i.e., La/traveling speed).

Next, in step S95, the position of the ball collector 1 at a time point earlier than the time point when each ball was counted by touching the count sensor 27, that is, the over-threshold time point stored in step S92 by the length of time Ja is determined based on the positional information acquired from the positional information acquisition unit 54, and the thus determined position is determined as the actual position where each ball was picked up (i.e., the actual positional information on each ball). That is, the position of the ball collector 1 at a time point earlier than the time point when each ball was counted by touching the count sensor 27 by the length of time Ja, which was taken for each ball to be counted by touching the count sensor 27 after having been picked up from the ground by the ball collection wheel 5, is determined as the actual position where each ball was picked up (i.e., the actual positional information on each ball) based on the positional information on the ball collector 1 acquired from the positional information acquisition unit 54.

In step S96, the actual positional information on each ball (i.e., the corrected positional information) obtained in step S95 is stored, and the flow ends.

Although the aforementioned embodiment illustrates two examples of the positional information correction method (FIGS. 11 and 12), it is needless to say that the present invention is not limited thereto.

Figure 13:
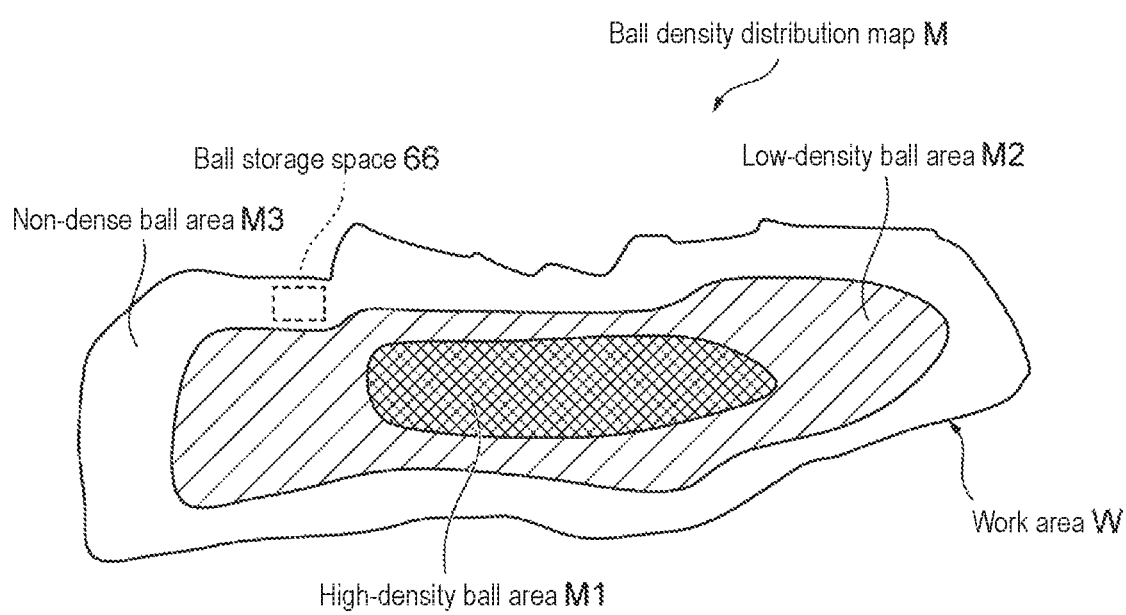
FIG. 13 is a schematic view illustrating an example of a ball density distribution map created from the actual positional information on balls.

As exemplarily illustrated in a schematic view of FIG. 13, a ball density distribution map M, which shows the scattering (i.e., distribution) state of balls, dense areas of balls, and the like, can be created, using the actual positional information on each ball obtained in step S85 of FIG. 11 or step S95 of FIG. 12. Herein, the ball density distribution map M includes three areas: a high-density ball area M1 in which balls are densely present (i.e., the density distribution is high), a low-density ball area M2 in which balls are not so densely present (i.e., the density distribution is low), and a non-dense ball area M3 in which balls are hardly densely present (i.e., the density distribution is almost zero). However, the map illustrated in FIG. 13 is only exemplary and it is needless to say that the division of the ball density distribution map M is not limited to that illustrated in FIG. 13. Using such a ball density distribution map M for controlling the travel of the ball collector 1 can perform a ball collecting operation more efficiently.

Figure 14:
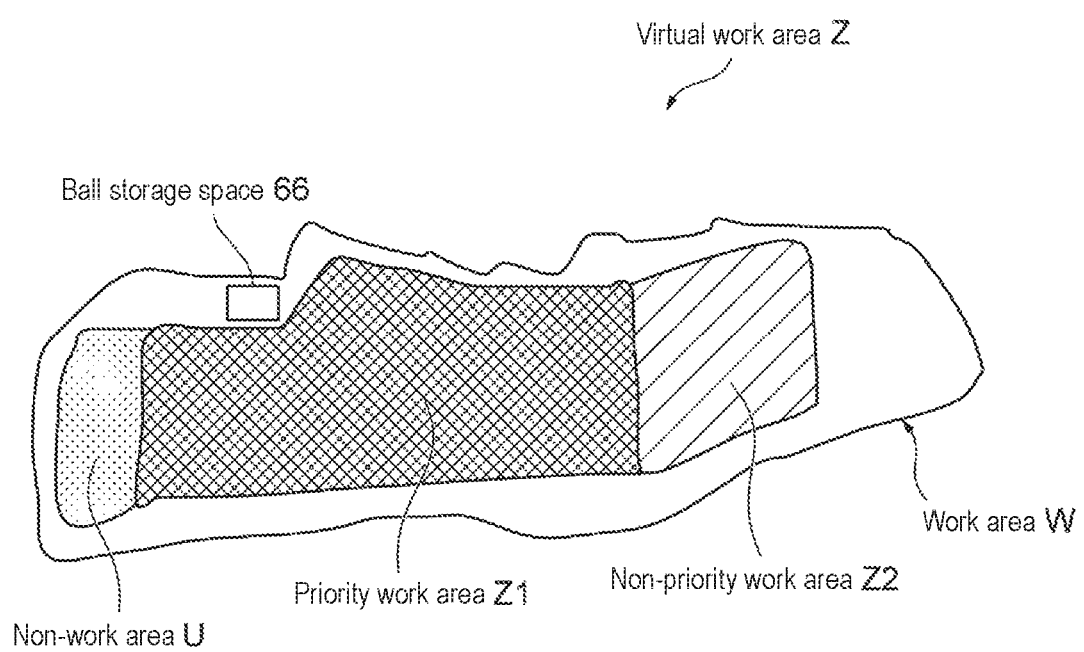
FIG. 14 is a schematic view illustrating an example of a virtual work area.

It is also possible to create a virtual work area Z as exemplarily illustrated in a schematic view of FIG. 14, using the aforementioned ball density distribution map M (or the actual positional information on each ball), for example. As an example, it is possible to create a priority work area Z1 (i.e., an area where a ball collecting operation is to be preferentially performed) of the virtual work area Z in the vicinity of the ball storage space 66, and create a non-priority work area Z2 and a non-work area U around the priority work area Z1. As further another example, it is also possible to create a priority work area Z1 (i.e., an area where a ball collecting operation is to be preferentially performed) of the virtual work area Z in the work area W, and provide the ball storage space 66 in the vicinity of the priority work area Z1. For example, considered is setting the priority work area Z1 such that it includes the high-density ball area M1 of the ball density distribution map M, setting the non-priority work area Z2 such that it includes the low-density ball area M2 of the ball density distribution map M, and setting the non-work area U as the non-dense ball area M3 other than the high-density ball area M1 and the low-density ball area M2 of the ball density distribution map M. Using such a virtual work area Z for controlling the travel of the ball collector 1 can perform a ball collecting operation more efficiently.

Figure 15:
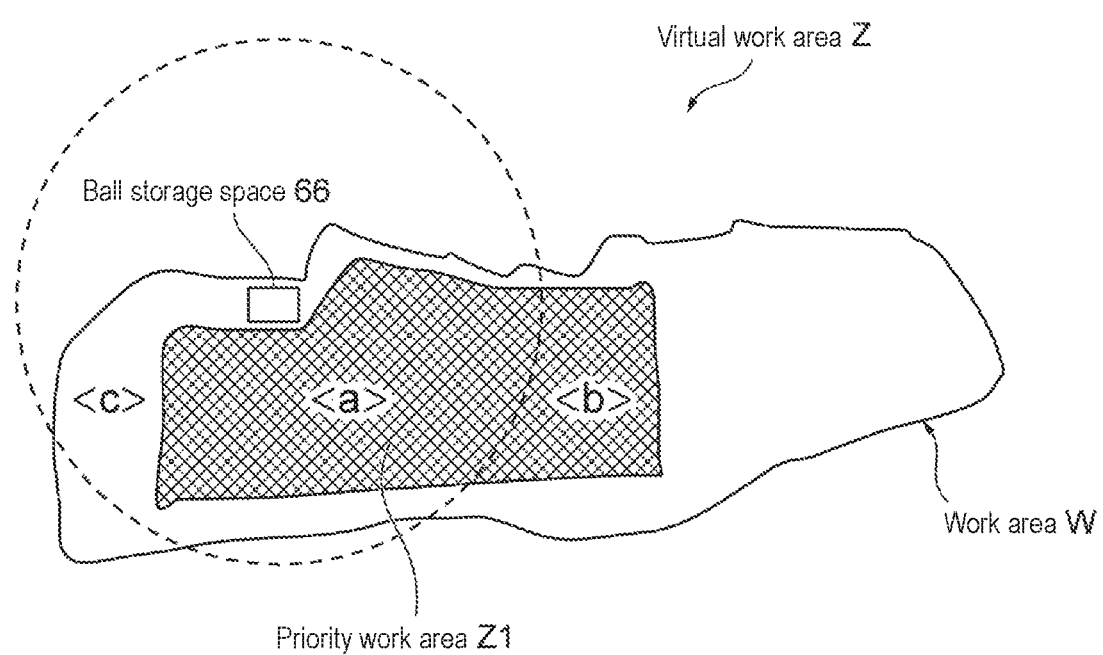
FIG. 15 is a view used for illustrating the definition of the vicinity of a ball storage space or a virtual work area (i.e., a priority work area)

It should be noted that the "vicinity" of the ball storage space 66 and the "vicinity" of the virtual work area Z (or the priority work area Z1) means a position in which, provided that a circle (indicated by the dotted line in FIG. 15) having the ball storage space 66 as the center is depicted such that the priority work area Z1 has an area of 2:1 (a:b), the priority work area Z1 is larger than the other area (c) of the work area W (see FIG. 15).

The aforementioned ball density distribution map M or virtual work area Z may be created within the controller 50 of the ball collector 1 or be created by the management server 70 that has received the actual positional information on each ball. Alternatively, the operator may create the ball density distribution map M or the virtual work area Z based on the actual positional information on each ball and input it to the controller 50 of the ball collector 1 or the management server 70.

As is clear from the aforementioned description, since the ball collector (i.e., the traveling collector) 1 of the present embodiment includes the count sensor 27 as a sensor for detecting the position of each collected ball at a position detected by a satellite positioning system, for example, it is possible to determine the position of each ball on the ground using a simple method. Specifically, the actual position where each ball was picked up is determined using, for example, the movement distance La of the ball collector 1 from the time each ball (i.e., each fallen object) was picked up from the ground by the ball collection wheel (i.e., the collection member) 5 till the ball was counted by touching the count sensor 27, or the length of time Ja taken for each ball (i.e., each fallen object) to be counted by the count sensor 27 after having been picked up from the ground by the ball collection wheel (i.e., the collection member) 5. Then, information on the determined actual positional is stored. For example, based on the positional information on the ball collector 1 at a time point when each ball was counted by touching the count sensor 27, the movement distance La of the ball collector 1 from the time each ball was picked up from the ground by the ball collection wheel 5 till the ball was counted by touching the count sensor 27 is reflected (returned) in the direction opposite to the traveling direction of the ball collector 1 at that time, whereby the actual position where each ball was picked up is determined. Alternatively, for example, the positional information on the ball collector 1 at a time point earlier than the time point when each ball was counted by touching the count sensor 27 by the length of time Ja, which was taken for each ball to be counted by touching the count sensor 27 after having been picked up from the ground by the ball collection wheel 5, is obtained, and the obtained positional information is determined as the actual position where each ball was picked up. Therefore, it is possible to determine the correct position of each ball on the ground only by improving software and without the need for significant changes to hardware, and thus provide the ball collector 1 that is highly reliable and cost-effective.

In addition, since the correct positions of balls can be determined, it is possible to grasp the correct scattering (i.e., distribution) state of the balls, the correct dense areas of the balls, and the like. Consequently, a ball collection operation can be performed more efficiently.

The aforementioned embodiment illustrates an example in which the ball collector 1 includes the count sensor 27 for counting the number of balls in the collection tank 8 as a sensor for detecting that each picked-up ball has been collected (i.e., detecting the position of each collected ball), at a position detected by a satellite positioning system, for example, and the count sensor 27 detects that each ball has been collected and identifies the position of the ball. Alternatively, the ball collector 1 may include a weight sensor for measuring the weight of each ball in the collection tank 8 and another sensor so that the weight sensor detects that each ball has been collected and the other sensor identifies the position of the ball. As a further alternative, the ball collector 1 may include a sensor for counting the number of balls in the collection tank 8 and another sensor so that the former sensor detects that each ball has been collected and the latter sensor identifies the position of the ball. For such sensors, a physical detection method using a button, a detection method using a laser, or a detection method using a camera image is considered, for example. In addition, it is desirable that any balls be detectable even if they are not expensive ones with built-in IC chips. In that case, the aforementioned sensor is preferably used to detect that each ball has been collected. In particular, the ball collector 1 is preferably an unmanned autonomous ball collector.

Figure 16:
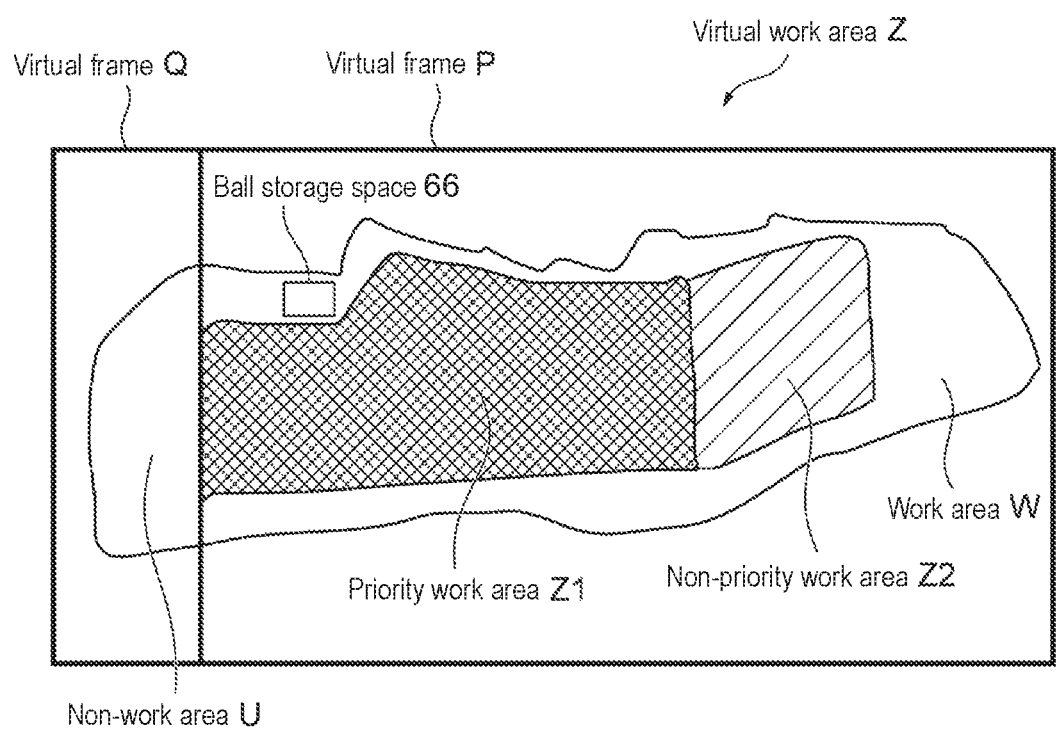
FIG. 16 is a schematic view illustrating an example in which the entire area is divided into an area for ordinary operations and a non-work area.

In addition, the ball density distribution map M may be created using the sensor according to the aforementioned embodiment, and, as exemplarily illustrated in a schematic view of FIG. 16, a user may set a virtual work area Z by setting a virtual frame P and a virtual frame Q and thus dividing the entire area into a work area W and a non-work area U so that when the ball collector 1 is not in the mode where an operation in the priority work area Z1 is prioritized, the ball collector 1 may be allowed to perform a normal operation within the work area W and the virtual frame P or perform a normal operation within the work area W while avoiding the area within the virtual frame Q. In such a case, each of the virtual frame P and the virtual frame Q can be formed in a simple shape on the ball density distribution map M.

As embodiments other than the aforementioned embodiment, the traveling body 6 may be not only a self-propelled, powered traveling body but also a human-powered traveling body such as a push-along or pull-along traveling body. In addition, the ball collection wheel 5 may be not only a wheel that rolls along with the travel of the traveling body 6 but also a wheel with a rotational driving force. Further, the place (i.e., area) where the ball collector 1 is used, the types of balls to be collected, and the like are not limited to the aforementioned examples.

Although the aforementioned embodiments illustrate examples in which the objects to be collected are golf balls, the present embodiment is not limited thereto and is similarly applicable when the objects to be collected are tennis balls, baseballs, nuts, or containers, for example.

Although the embodiments of the present invention have been described in detail above, the specific configuration is not limited thereto, and any design changes and the like that are within the spirit and scope of the present invention are encompassed by the present invention. In addition, the techniques of the aforementioned embodiments can be combined as appropriate as long as there is no contradiction or problem in the objects, configurations, or the like of the embodiments.

What is claimed is:

1. A traveling collector for picking up and collecting fallen objects scattered on a surface while traveling on the surface, comprising:
    a collection member adapted to pick up fallen objects from the surface;
    a controller configured to perform traveling control of the traveling collector on the surface, and acquire information on a position of the traveling collector detected by a positioning system; and
    a sensor for detecting that each fallen object picked up by the collection member has been collected, at the position detected by the positioning system, wherein the controller is configured to:
    determine an actual position where each fallen object was picked up using a movement distance of the traveling collector from a time the fallen object was picked up from the surface by the collection member till the fallen object was detected by the sensor, or using a length of time taken for the fallen object to be detected by the sensor after having been picked up from the surface by the collection member; and
    store information on the determined actual position.

2. The traveling collector according to claim 1, wherein the controller is configured to determine a position that is obtained by reflecting, based on the information on the position of the traveling collector at a time point when the fallen object was detected by the sensor, the movement distance of the traveling collector from the time the fallen object was picked up from the surface by the collection member till the fallen object was detected by the sensor in a direction opposite to a traveling direction of the traveling collector at that time, as the actual position where each fallen object was picked up.

3. The traveling collector according to claim 1, wherein the controller is configured to determine a position of the traveling collector at a time point earlier than a time point when the fallen object was detected by the sensor by the length of time taken for the fallen object to be detected by the sensor after having been picked up from the surface by the collection member, as the actual position where each fallen object was picked up, based on the information on the position of the traveling collector.

4. The traveling collector according to claim 3, wherein the controller is configured to determine the length of time by dividing the movement distance of the traveling collector from the time the fallen object was picked up from the surface by the collection member till the fallen object was detected by the sensor by a traveling speed of the traveling collector at that time.

5. The traveling collector according to claim 1, wherein:
    the sensor is a contact-type sensor configured to detect a fallen object picked up by the collection member when the fallen object has touched the sensor, and
    the controller is configured to determine an actual position where the fallen object was picked up using a movement distance of the traveling collector from a time the fallen object was picked up from the surface by the collection member till the fallen object touched the sensor, or using a length of time taken for the fallen object to touch the sensor after having been picked up from the surface by the collection member.

6. The traveling collector according to claim 1, wherein the controller is configured to send to a management server for the traveling collector information on the actual position where the fallen object was picked up.

7. The traveling collector according to claim 1, wherein the controller is configured to acquire the information on the position of the traveling collector by receiving a positioning signal from a satellite of a satellite positioning system.

8. The traveling collector according to claim 1, wherein the collection member is adapted to pick up fallen objects from a surface by rolling on the surface as the traveling collector travels on the surface.

9. The traveling collector according to claim 8, wherein:
    the collection member has multiple elongated grooves including a number of annular grooves on an outer circumference of the collection member,
    each annular groove has a number of pockets formed along a circumferential direction for picking up fallen objects on a surface, and
    the pockets of the adjacent annular grooves are provided such that the pockets are displaced from each other by a predetermined angle in the circumferential direction.

10. The traveling collector according to claim 9, wherein the sensor includes a single sensor disposed across all of the annular grooves.

11. The traveling collector according to claim 9, further comprising a pectinate releasing member arranged in a manner protruding into each of the annular grooves so as to release fallen objects picked up by the collection member from the collection member, wherein the sensor is disposed on the releasing member.

12. The traveling collector according to claim 1, wherein the sensor is a count sensor for counting fallen objects picked up by the collection member.

13. A traveling collector for picking up and collecting balls scattered on a surface while traveling along a traveling path set on the surface in accordance with a predetermined program, comprising:
    a ball collection wheel adapted to pick up balls from the surface by rolling on the surface;
    a sensor for detecting that each ball picked up by the ball collection wheel has been collected; and
    a controller configured to perform traveling control of the traveling collector on the surface, and acquire information on a position of the traveling collector detected by a positioning system, wherein:
    the controller is configured to:
    determine an actual position where each ball was picked up using a movement distance of the traveling collector from a time the ball was picked up from the surface by the ball collection wheel till the ball was detected by the sensor, or using a length of time taken for the ball to be detected by the sensor after having been picked up from the surface by the ball collection wheel, and
    store information on the determined actual position on each ball.

* * * * *